(12) United States Patent
Johnson (10) Patent No.: US 9,809,170 B2
(45) Date of Patent: Nov. 7, 2017

(54) VEHICLE SIDE MIRROR PROTECTOR

(71) Applicant: Michael Johnson, Henderson, NV (US)

(72) Inventor: Michael Johnson, Henderson, NV (US)

(73) Assignee: U-Haul International, Inc., Phoenix, AZ (US)

( * ) Notice: Subject to any disclaimer, the term of this patent is extended or adjusted under 35 U.S.C. 154(b) by 0 days.

(21) Appl. No.: 14/743,067

(22) Filed: Jun. 18, 2015

(65) Prior Publication Data

US 2016/0368421 A1    Dec. 22, 2016

(51) Int. Cl.
*B60R 1/06* (2006.01)
*B60R 1/076* (2006.01)

(52) U.S. Cl.
CPC ............ *B60R 1/076* (2013.01); *B60R 1/0605* (2013.01); *B60R 1/0617* (2013.01)

(58) Field of Classification Search
CPC ..... B60R 1/006; B60R 1/0605; B60R 1/0617; B60R 1/076
USPC .................................. 359/841, 872; 248/479
See application file for complete search history.

(56) References Cited

U.S. PATENT DOCUMENTS

| | | | |
|---|---|---|---|
| 1,110,973 A * | 9/1914 | Tischler .................. | B60R 1/078 248/201 |
| 1,893,245 A * | 1/1933 | Ritz Woller .............. | B60R 1/06 248/278.1 |
| 1,921,310 A * | 8/1933 | Crisman ................ | B60R 1/0617 248/287.1 |
| 2,047,325 A * | 7/1936 | Jones ...................... | B60R 1/078 248/477 |
| 2,424,222 A * | 7/1947 | Brown .................... | B60R 1/076 248/276.1 |
| 2,524,731 A | 10/1950 | Mattel | |
| 2,708,086 A * | 5/1955 | Prutzman .............. | B60R 1/0605 248/485 |
| 2,827,255 A * | 3/1958 | Kampa ................... | B60R 1/078 248/285.1 |
| 2,969,715 A * | 1/1961 | Mosby .................. | B60R 1/0617 248/285.1 |
| 3,047,142 A | 7/1962 | Heffley | |
| 3,189,309 A * | 6/1965 | Hager ..................... | B60R 1/078 248/279.1 |
| 4,218,036 A * | 8/1980 | Pitkanen ............... | B60R 1/0617 248/478 |
| 4,441,790 A * | 4/1984 | Williams ............ | B66F 9/07504 359/841 |

(Continued)

*Primary Examiner* — Ricky D Shafer
(74) *Attorney, Agent, or Firm* — Richard E. Oney; Tiffany & Bosco, P.A.

(57) ABSTRACT

An apparatus for protecting a side mirror of a vehicle, such as a fork lift, includes a side mirror assembly that has a support frame and a side mirror mounted to the support frame. The support frame is hingedly mounted to the vehicle and has an outer end disposed outwardly from the vehicle. A contact wheel is mounted to the side mirror assembly so that the wheel can rotate in a generally horizontal plane. The wheel is mounted below the mirror and has a peripheral contact surface that extends outward, rearward and forward beyond the side mirror and beyond the support frame. When the surface of an obstacle contacts the wheel peripheral surface, the wheel will rotate and ride along the obstacle, allowing the arm to properly pivot forward or rearward without damaging the side mirror.

16 Claims, 13 Drawing Sheets

(56) References Cited

U.S. PATENT DOCUMENTS 4,504,118 A * 3/1985 Harig ................... B60R 1/081
                                                            248/479
4,592,529 A    6/1986 Suzuki

* cited by examiner

VEHICLE SIDE MIRROR PROTECTOR

BACKGROUND

This invention relates generally to vehicle side mirrors. More particularly, it relates to an apparatus for protecting a vehicle's side mirrors from damage without impeding the view from the side mirror.

Manufacturers of vehicles such as forklifts typically mount exterior side mirrors at the end of upper and lower mirror support arms that are attached to the vehicle by spring loaded hinges. These hinges allow the support arms to pivot so that they collapse toward the vehicle when a sufficient amount of force is applied to them. The hinge prevents the arms from being ripped off the vehicle when the side mirror or the support arms contact a stationary object. The side mirrors are typically mounted to mirror arms at an angle, which leaves the mirror protruding beyond the mirror support arms. Consequently, the side mirrors often impact stationary obstacle during normal warehouse operations. For example, when a forklift enters into a semi-truck to load or unload the truck, the forklift often has clearance on each side as little as 1½" to 2" and the side mirrors often impact the truck walls. As another example, when a forklift is parked close to a loading platform, the side mirrors will often impact the platform when the forklift is moved. Although such impacts may cause the mirror support arms to pivot, the impacts often result in side mirror breakage during the collapsing of the mirror support arms. As a result, side mirrors of such vehicles frequently need to be replaced.

There is a need for an apparatus that addresses the foregoing problems. It is an object of the present invention to provide such an apparatus.

Additional objects and advantages of the invention will be set forth in the description that follows, and in part will be apparent from the description, or may be learned by practice of the invention. The objects and advantages of the invention may be realized and obtained by means of the instrumentalities and combinations pointed out in the appended claims.

SUMMARY

To achieve the foregoing objects, and in accordance with the purposes of the invention as embodied and broadly described in this document, there is provided an apparatus for protecting side mirrors of a vehicle, such as a fork lift. The apparatus includes a side mirror assembly that has a support frame and a side mirror mounted to the support frame. The support frame is hingedly mounted to the vehicle and has an outer end disposed outwardly from the vehicle. A contact wheel is mounted to the side mirror assembly so that the wheel can rotate in a generally horizontal plane. The wheel has a peripheral contact surface that extend outward, rearward and forward beyond the side mirrors and beyond the support frames. In one presently preferred embodiment, the wheel is generally circular in shape, has a diameter that is greater than the width of the side mirrors and is mounted below the side mirrors.

With the apparatus of the present invention, when the surface of the wheel peripheral contact comes into contact with an obstacle surface, the wheel will rotate and ride along the obstacle, allowing the support arms to pivot forward or rearward without damaging the side mirrors. This allows the vehicle to drive in tight spaces and to come into contact with obstacles without breaking the vehicle side mirrors.

BRIEF DESCRIPTION OF THE DRAWINGS

The accompanying drawings, which are incorporated in and constitute a part of the specification, illustrate the presently preferred embodiments and methods of the invention and, together with the general description given above and the detailed description of the preferred embodiments and methods given below, serve to explain the principles of the invention.

DESCRIPTION

Reference in this application is made to presently preferred embodiments of the invention. While the invention is described more fully with reference to these examples, the invention in its broader aspects is not limited to the specific details, representative devices, and illustrative examples shown and described. Rather, the description is to be understood as a broad, teaching disclosure directed to persons of ordinary skill in the appropriate arts, and not as limiting upon the invention.

It will be appreciated that terms such as "forward," "rearward," "upper," "inner," "outer," "vertical," "horizontal," "bottom," "below," "top," "side," "inwardly," "outwardly," "downwardly" and "lower" and other positionally descriptive terms used in this specification are used merely for ease of description and refer to the orientation of the referenced components as shown in the figures. It should be understood that any orientation of the components described herein is within the scope of the present invention. The term "generally" as used in this specification is defined as "being in general but not necessarily exactly or wholly that which is specified." For example, "generally perpendicular" is used herein to indicate components that are in general, but not necessarily exactly or wholly, perpendicular.

In the drawings, the reference numeral 10 designates a fork lift vehicle that includes a side mirror assembly 11 with a contact wheel 36 mounted to it in accordance with the present invention. The side mirror assembly 11 is hingedly mounted to and extends outwardly from the vehicle 10 to an outer end 15 on which the contact wheel 36 is mounted. As shown in FIGS. 1-2 and 11-13, when the wheel 36 engages a stationary obstacle 50 (whether from the front or from the rear) as the driver 60 drives the vehicle, the hinged side mirror assembly 11 will pivot so that it collapses toward the vehicle 10.

Referring to FIGS. 1-7, in one embodiment of the invention, the side mirror assembly 11 includes a generally U-shaped mirror support frame 13 that has an upper support arm 16, a lower support arm 18 and an end support arm 19 that connecting the upper and lower support arms 16, 18. Each of the upper and lower support arms 16, 18 extends generally perpendicularly from support arm bracket 12 that is fixed to the vehicle 10. Each of the upper and lower support arms 16, 18 includes a spring-loaded hinge 14 that is mounted to one of the support arm brackets 12. The spring-loaded hinge 14 allows the mirror support frame 13 to pivot rearward toward the vehicle 10 when a rearward force is applied to it and to pivot forward toward the vehicle 10 when a forward force is applied to it. For structural support, the frame 13 also includes a diagonal support arm 20 mounted diagonally between the upper and lower support arms 16, 18 and an intermediate support arm 21 mounted generally vertically between upper and lower support arms 16, 18 with mounting brackets 17.

Still referring to FIGS. 1-7, a side mirror 32 is mounted generally vertically between the upper and lower support arms 16, 18. An upper mirror bracket 22 is fixed to the upper support arm 16 and a lower mirror bracket 24 is fixed to the lower support arm 18. A slotted hole 23 in the upper mirror bracket 22 receives an upper mirror bolt, which extends from the top of the mirror 32 and is mounted to the upper mirror bracket 22 using a nut and washer arrangement 38. A lower bolt extending from the bottom of the mirror 32 is mounted to the lower mirror bracket 24 with a similar nut and washer arrangement 40.

As can be seen in FIGS. 3-10, in one embodiment, the contact wheel 36 is mounted below the side mirror 32 to the lower mirror bracket 24 so that the wheel 36 can rotate in a generally horizontal plane. The wheel 36 is mounted on a threaded bolt 26 between washers 30 so that the wheel 36 can rotate freely. The bolt 26 is fixed to the lower mirror bracket 24 via a nut and washer arrangement 26. A tubular spacer 34 prevents the wheel 36 from sliding up and down on the bolt 26. Although in the embodiment shown the contact wheel 36 is mounted below the side mirror 32, upon reading this disclosure it will be understood that the contact wheel 36 could be mounted in a similar fashion above the side mirror 32. The wheel 36 is generally circular in shape and at its periphery 37 has a contact surface 39 for contacting obstacle at the side of the vehicle 10. The wheel 36 is positioned and sized so that the it has a peripheral portion extending outwardly beyond the side mirror assembly outer end 15, a peripheral portion extending rearward of the side mirror assembly outer end 15 and a peripheral portion extending forward of the side mirror assembly outer end 15.

In the foregoing configuration, when the surface of the wheel contact surface 39 comes into contact with an obstacle 50, the wheel 36 can rotate and the side mirror support frame 13 can pivot toward the vehicle 10 to minimize damage to the side mirror 32.

Figure 1:
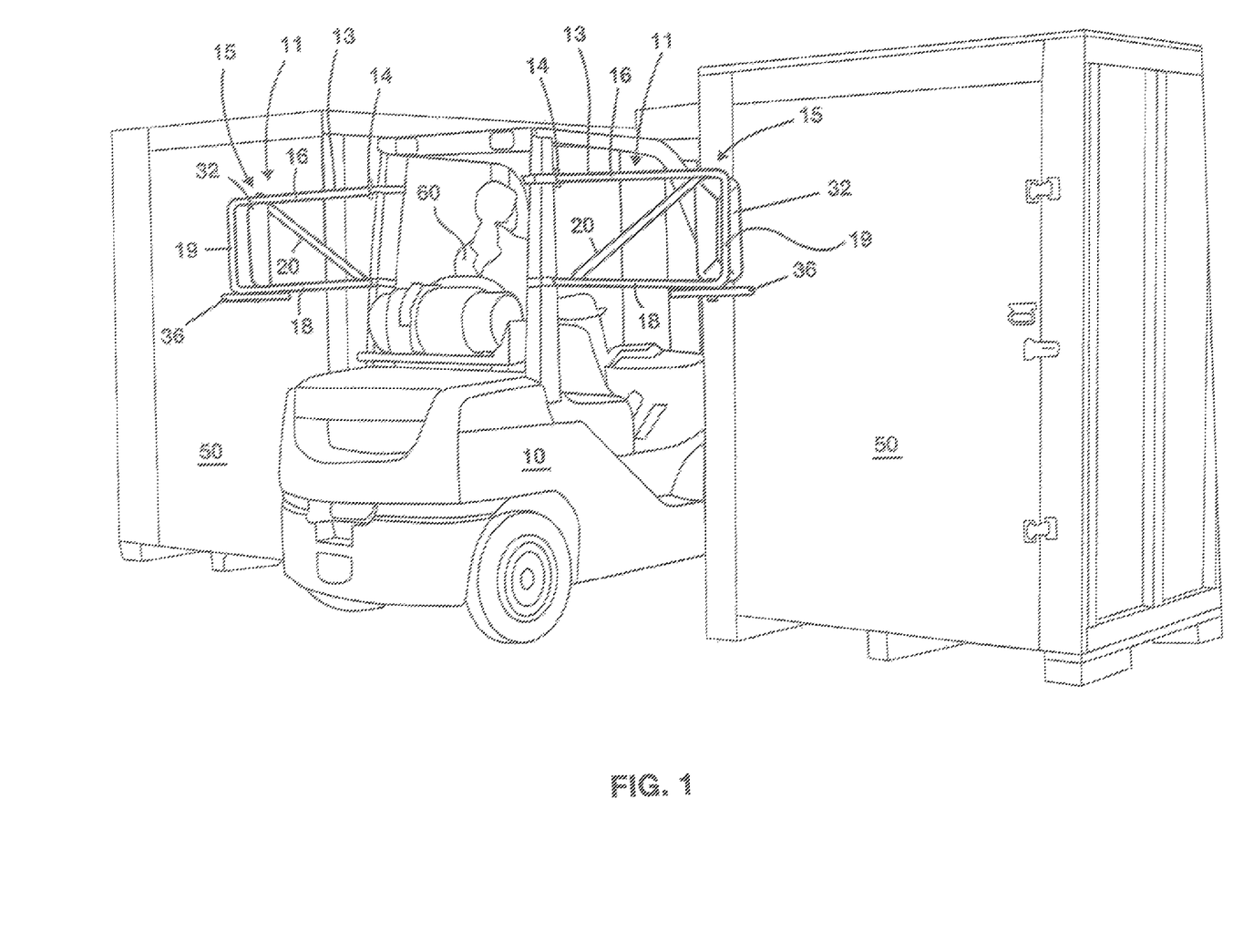
FIG. 1 is a perspective view of a fork lift equipped with side mirror assemblies with and one embodiment of a contact wheel according to the present invention, showing the fork lift entering an area between two storage boxes.
Figure 2:
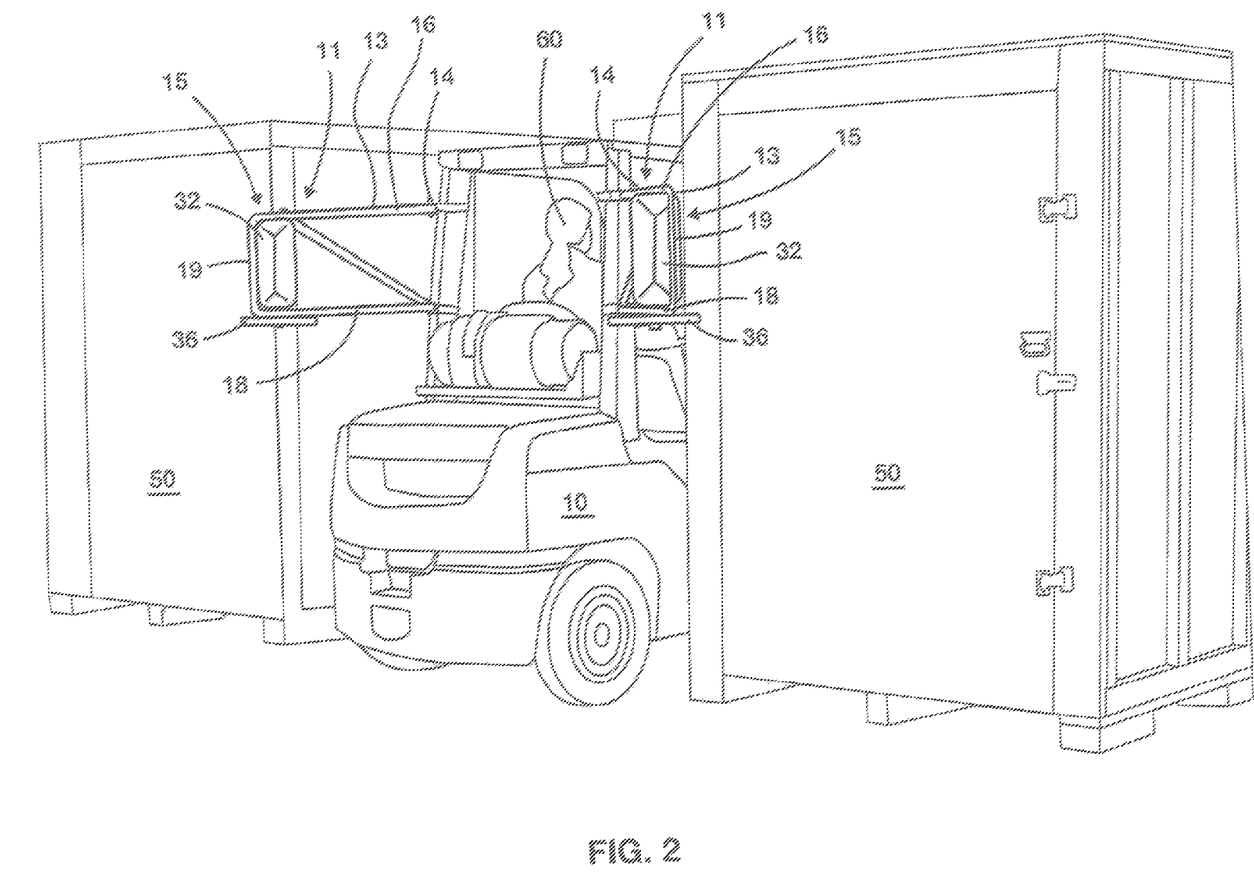
FIG. 2 is a perspective view the fork lift of FIG. 1, showing how the side mirror assemblies pivot rearward as the wheel contacts the storage boxes.
Figure 3:
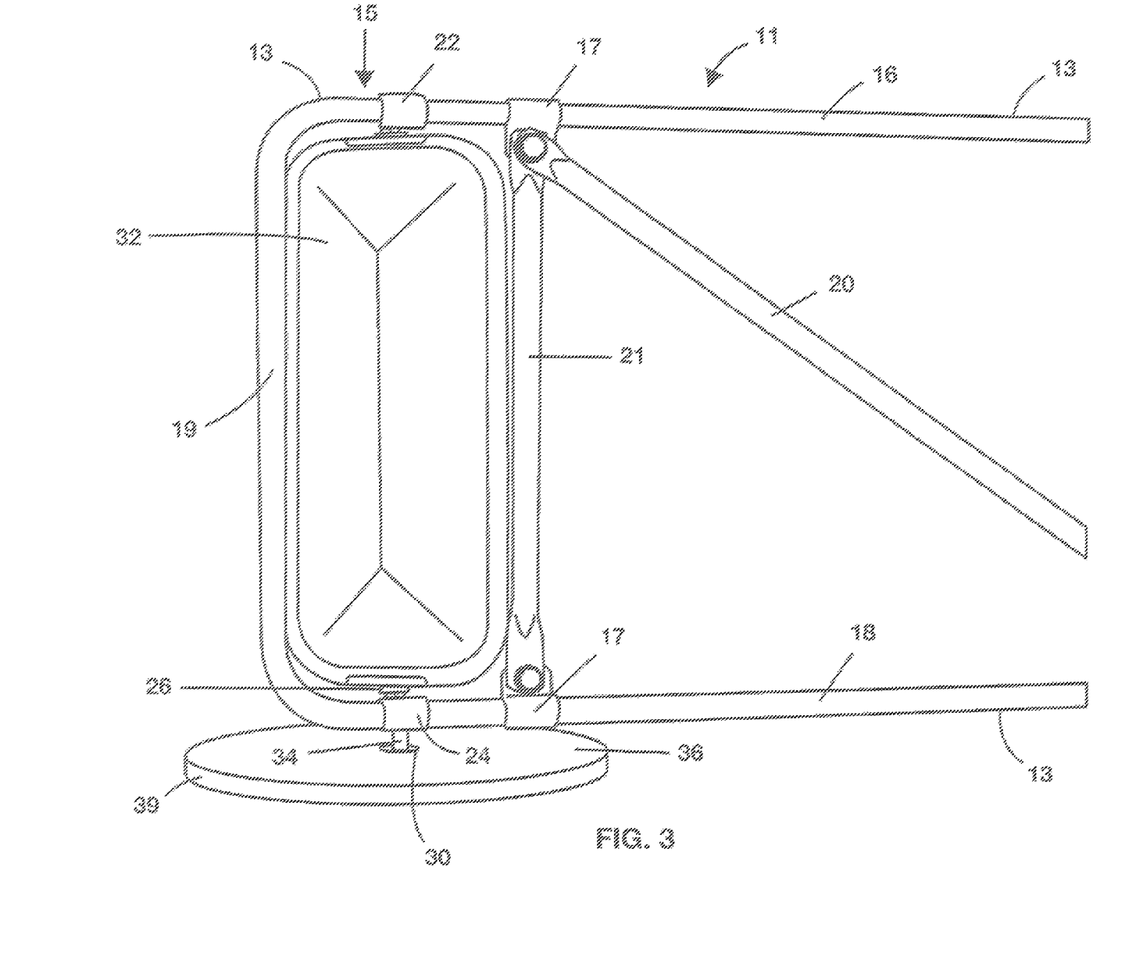
FIG. 3 is a rear view of the outer end of the side mirror assembly of FIG. 1 showing the contact wheel mounted to the assembly below the mirror.
Figure 4:
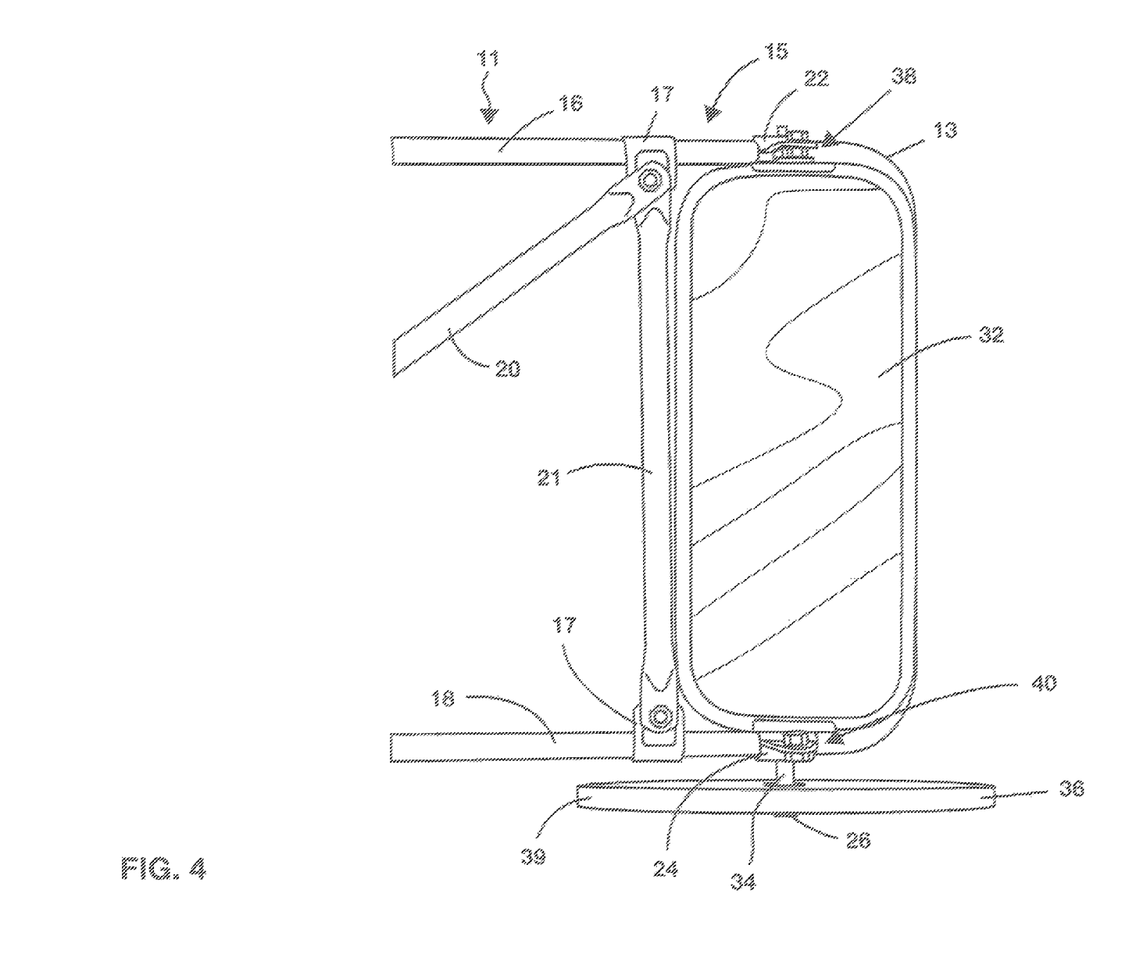
FIG. 4 is a front view of the side mirror assembly of FIG. 3.
Figure 5:
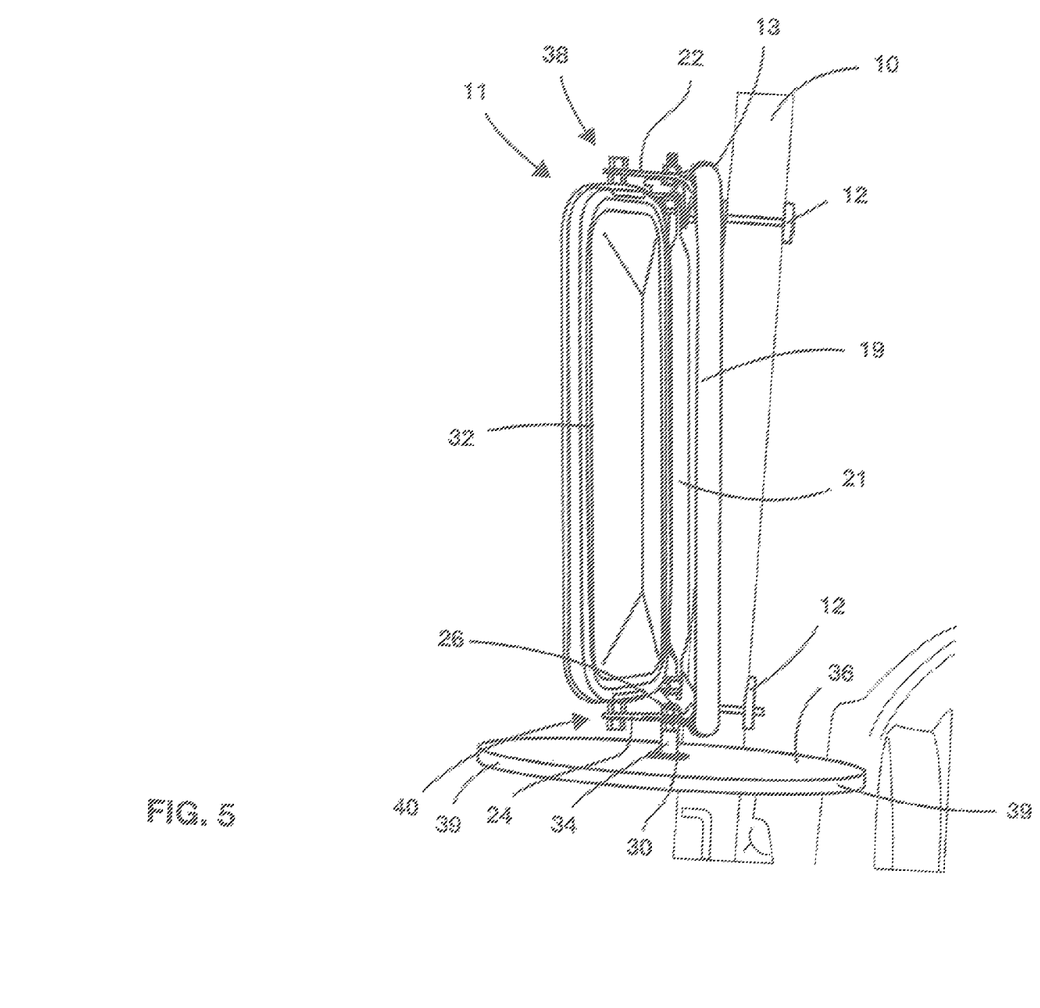
FIG. 5 is side view of the side mirror assembly of FIG. 3.
Figure 6:
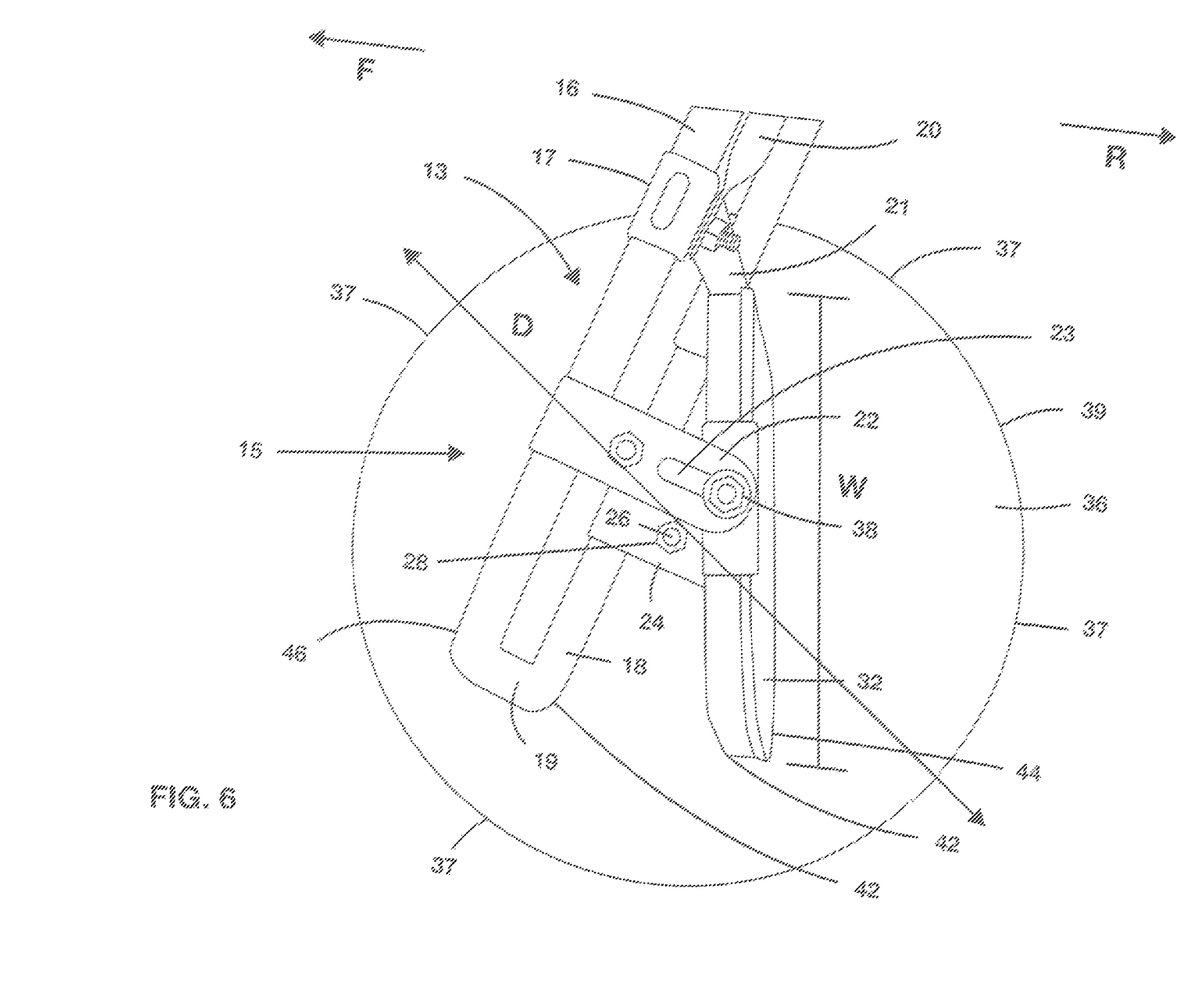
FIG. 6 is a top view of the side mirror assembly of FIG. 3 showing the rearward direction indicated by arrow R and the forward direction indicated by arrow F.
Figure 7:
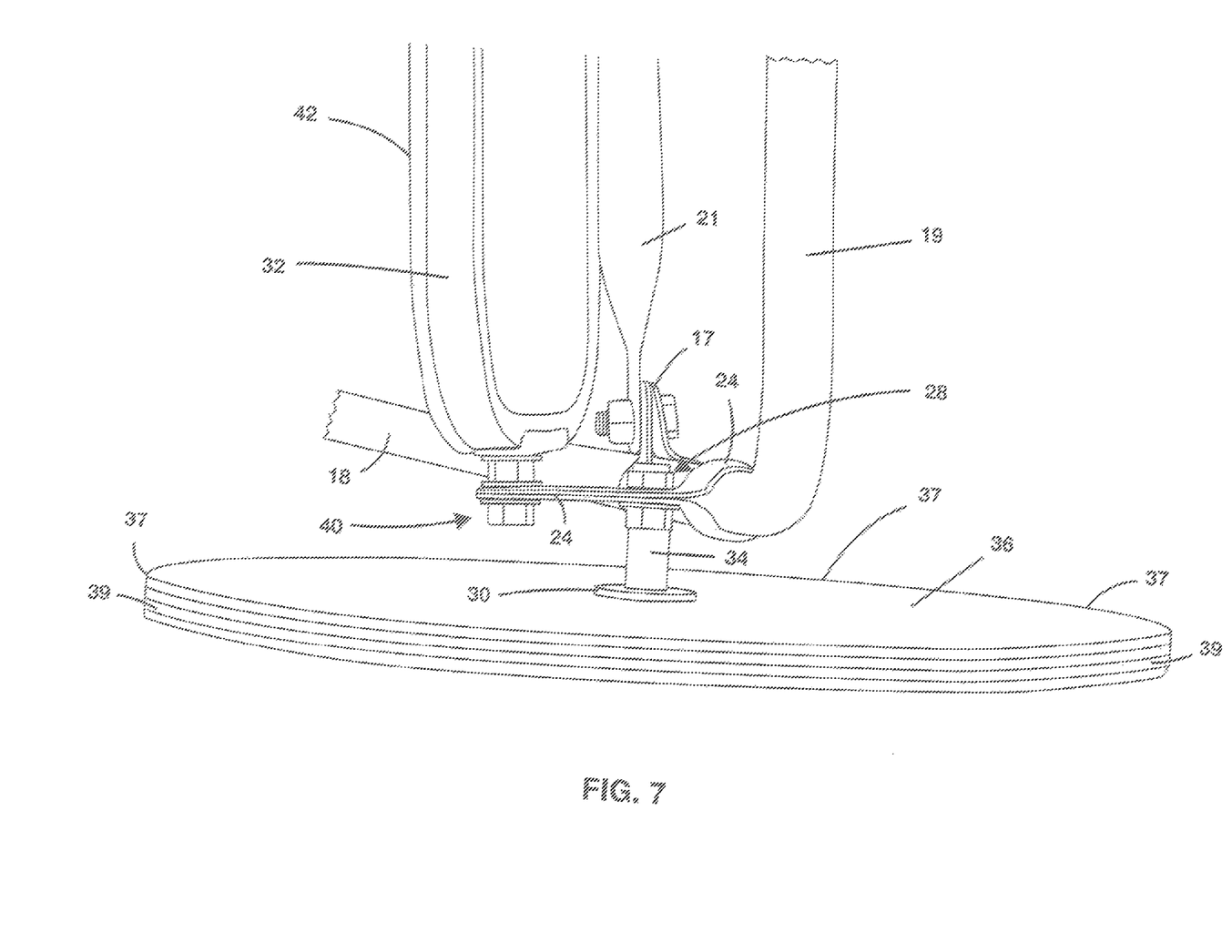
FIG. 7 is an enlarged side perspective view showing more detail of the wheel mounted to the side mirror assembly of FIG. 3.
Figure 8:
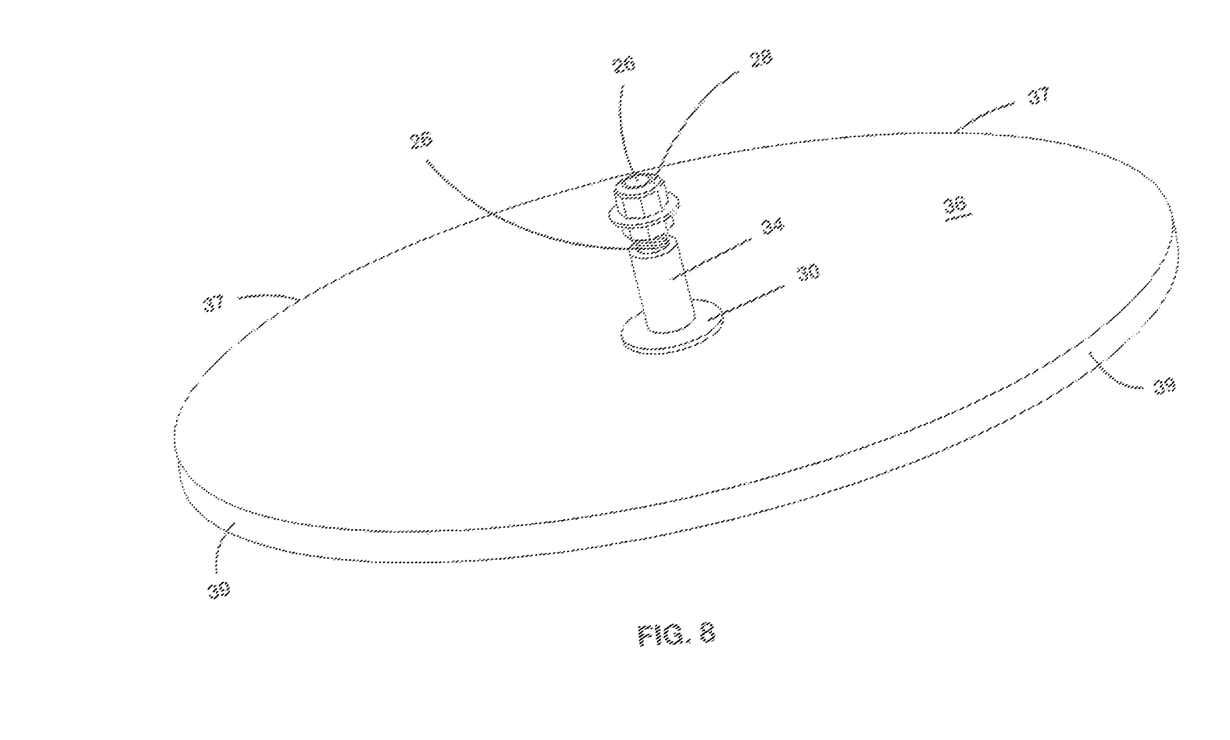
FIG. 8 is a top perspective view of the wheel of FIG. 7.
Figure 9:
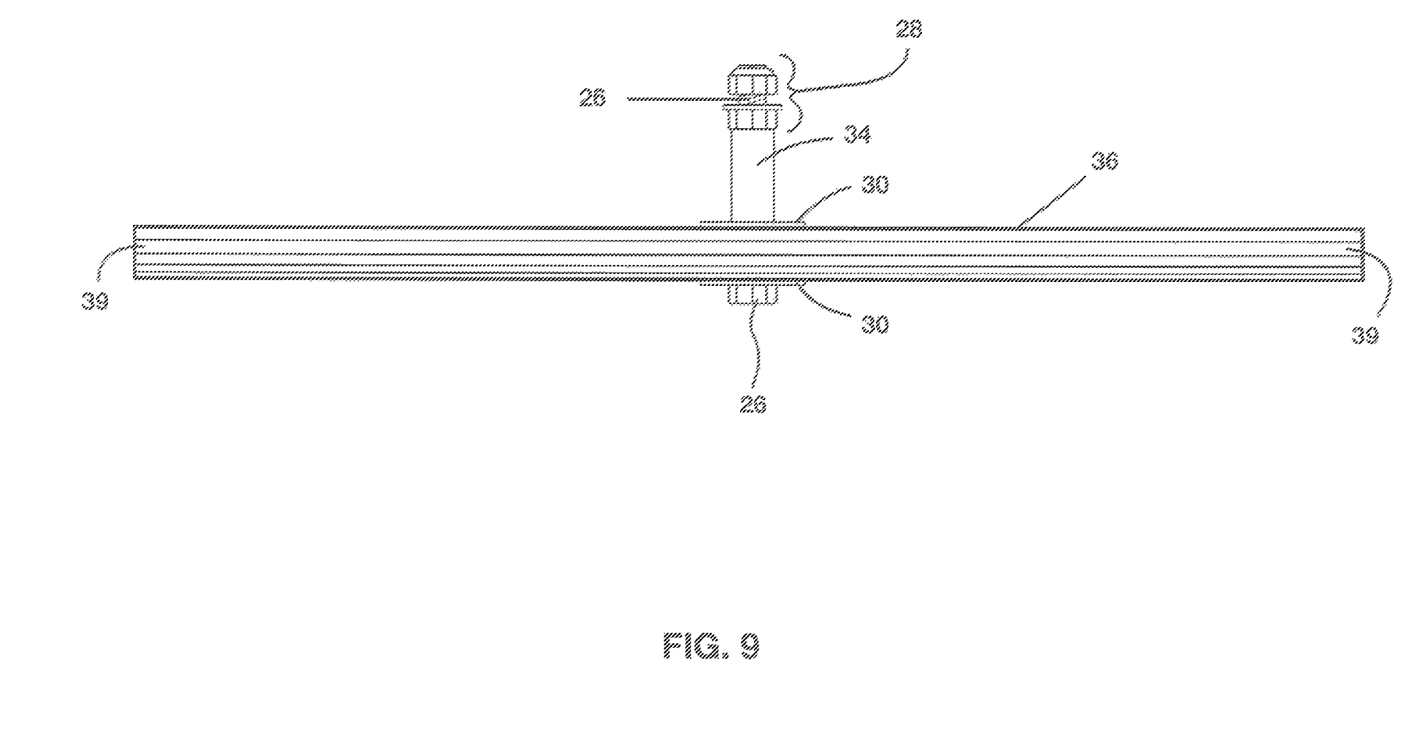
FIG. 9 is a side elevation view of the wheel of FIG. 7.
Figure 10:
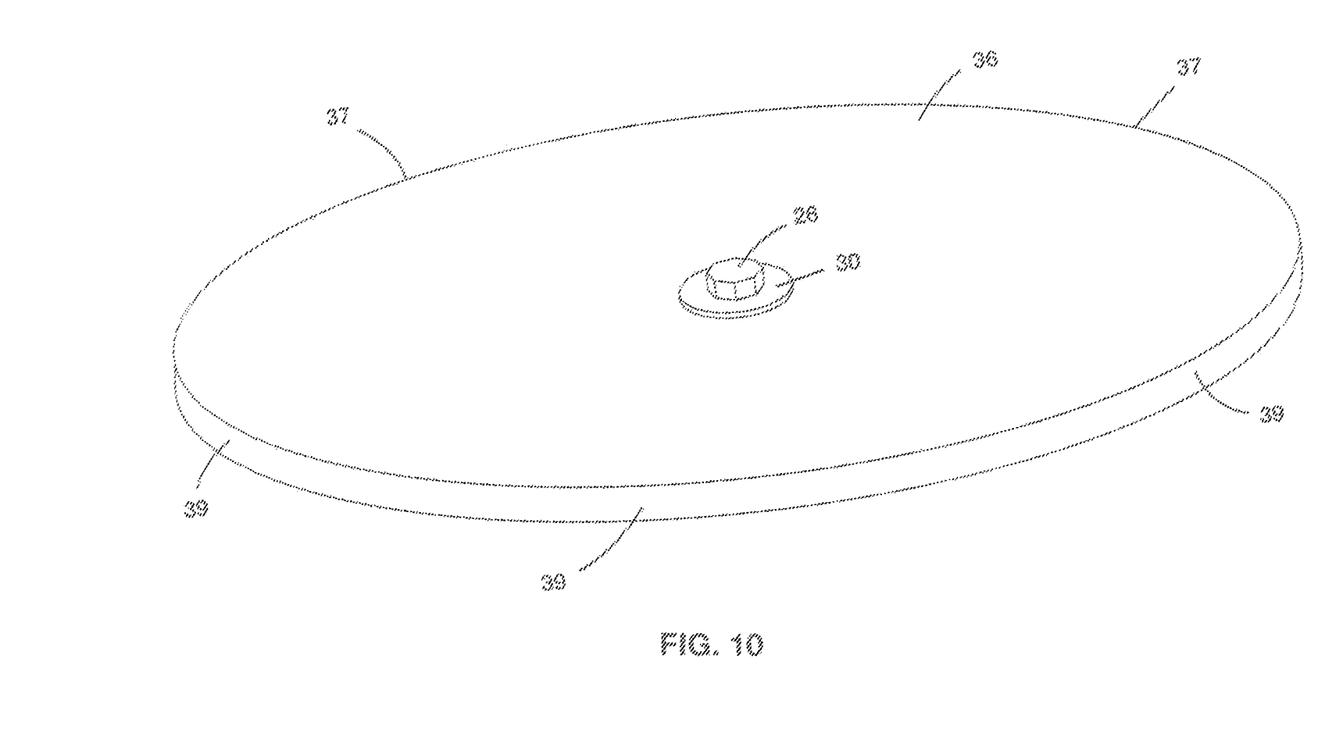
FIG. 10 is a perspective view of the bottom of the wheel FIG. 7.
Figure 11:
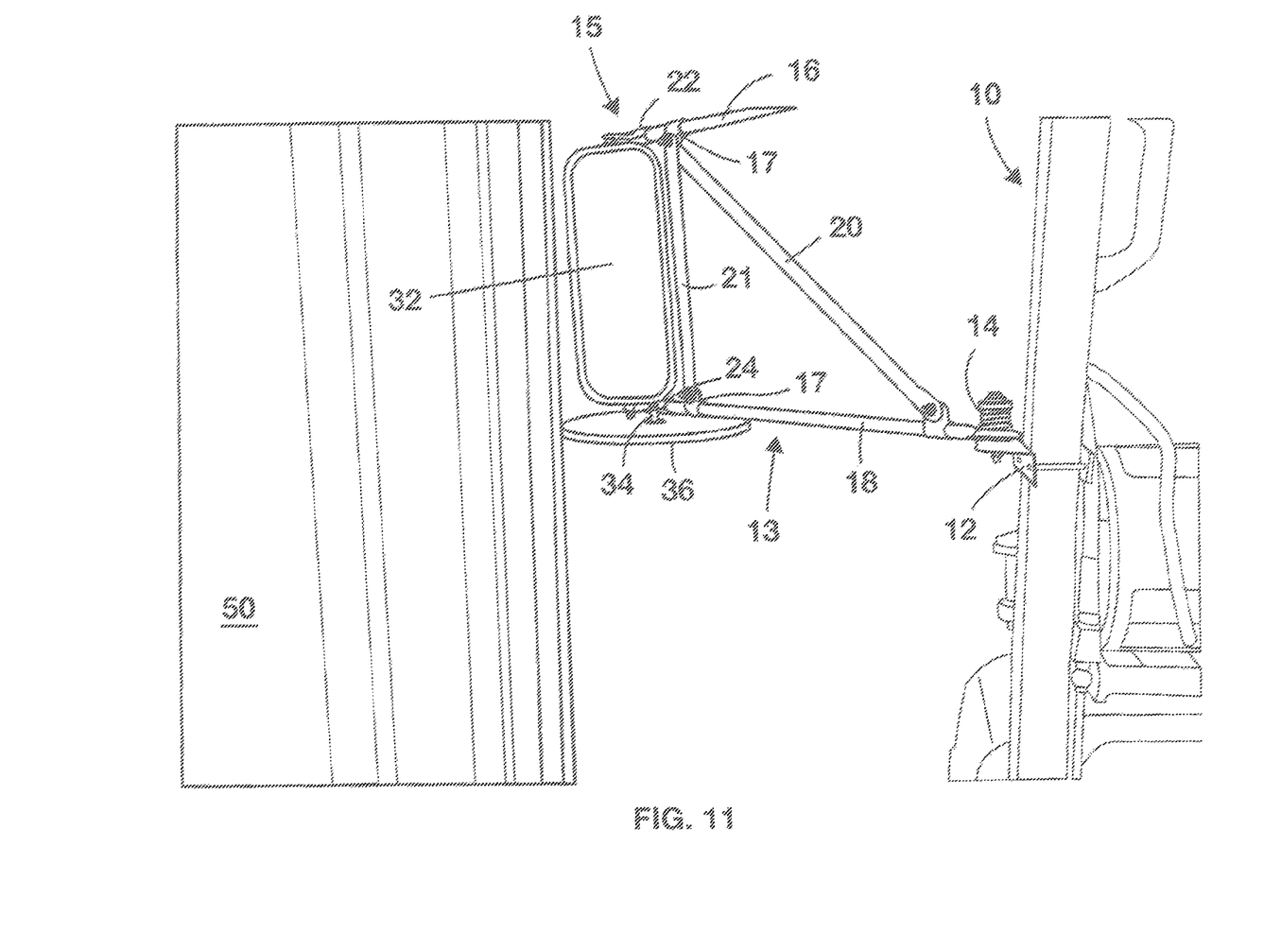
FIG. 11 is a front perspective view of a portion of the side mirror assembly and forklift showing the side mirror assembly partially pivoted rearward as the wheel contacts the storage boxes.
Figure 12:
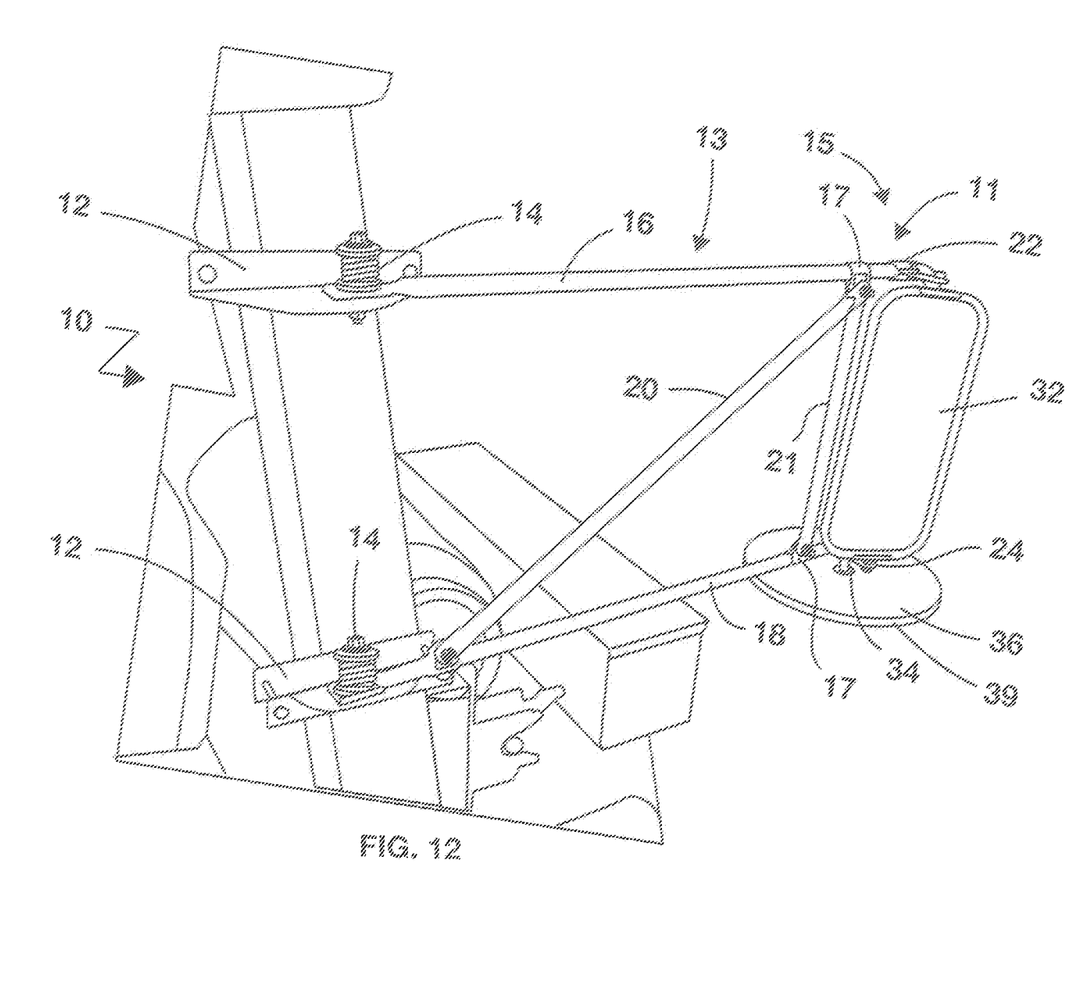
FIG. 12 is a perspective view of the rear portion of the forklift of FIG. 11 showing the side mirror assembly pivoted completely rearward.
Figure 13:
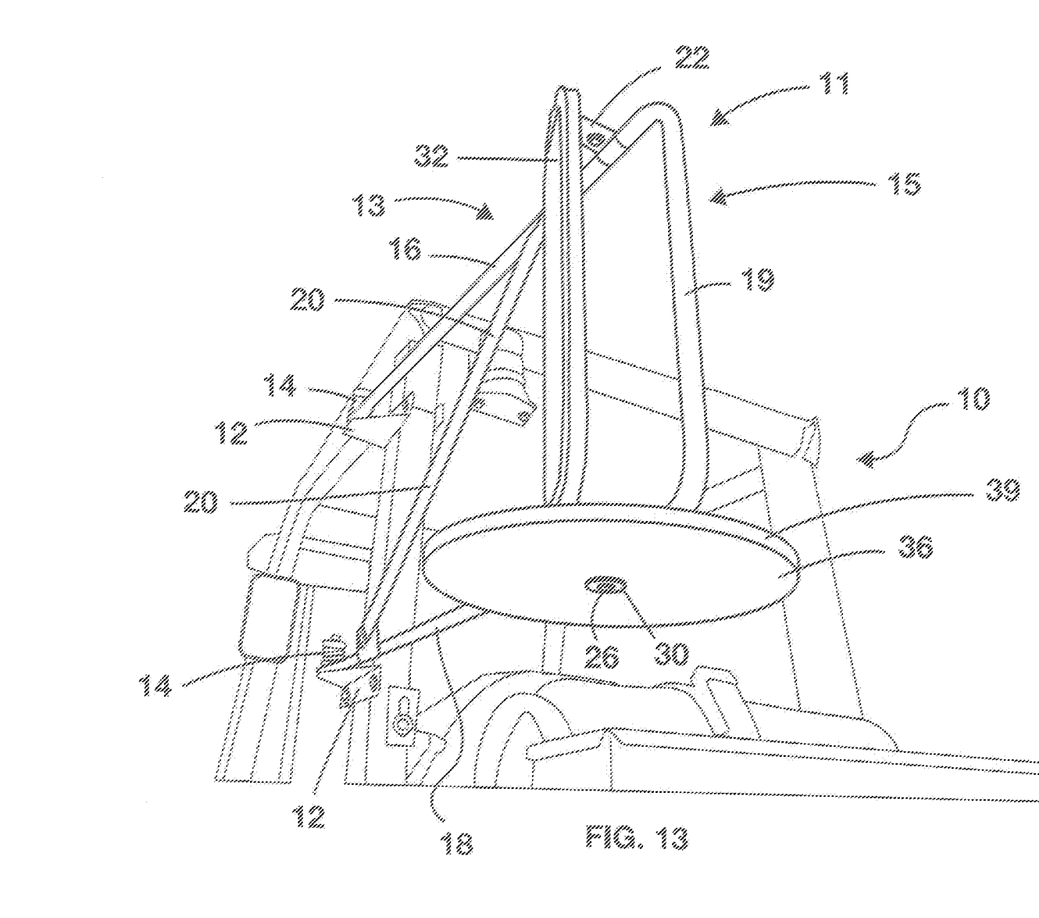
FIG. 13 is a bottom perspective view of the forklift and side mirror assembly of FIG. 12.

Referring to FIG. 6, the rearward direction indicated by arrow R and the forward direction indicated by arrow F. As can be seen in FIG. 6, the wheel 36 has a diameter D that is greater than a width W of the side mirror 32. A portion of the wheel contact surface 39 is disposed outward beyond outermost portions 42 of the mirror support frame 13 and the side mirror 32. The wheel contact surface 36 also has portions that are disposed rearward beyond a rear side 44 of the side mirror assembly 11 and forward beyond a forward side 46 of the side mirror assembly 11. Because wheel 36 extends horizontally beyond the side mirror 32 and the upper and lower supporting arms 16, 18, the wheel 36 will roll along a stationary obstacle that it contacts (such as storage boxes or the inside wall of a truck being loaded or unloaded) and prevents the side mirror 32 from coming into contact with the object, thereby protecting the side mirror from breakage.

From the foregoing, it can be seen that the apparatus of the present invention possesses numerous advantages. It allows for a side mirror assembly to collapse upon impact with a stationary object from either the forward or rearward direction, while at the same time protecting the vehicle's side mirror from contacting the stationary object. This minimizes damage to the vehicle's side mirror, which reduces the need to replace mirrors.

Upon reading this disclosure, additional advantages and modifications will readily occur to those skilled in the art. Therefore, the invention in its broader aspects is not limited to the specific details, representative devices, and illustrative examples shown and described. Accordingly, departures may be made from such details without departing from the spirit or scope of the general inventive concept.

What is claimed is:

1. An apparatus for protecting a side mirror of a vehicle, the apparatus comprising:
   a side mirror support frame pivotally mounted to the vehicle and having an outer end disposed outwardly from the vehicle;
   a side mirror mounted to the support frame and having an outer side; and
   a wheel mounted to the support frame or the side mirror so that the wheel can rotate in a generally horizontal plane;
   wherein the wheel includes a peripheral contact surface having a portion that extends outwardly beyond the support frame outer end and beyond the side mirror outer side; and
   wherein the wheel contact surface includes a portion that extends forward beyond the support frame and the side mirror;
   whereby when a surface of an obstacle contacts the wheel contact surface, the wheel can rotate and the side mirror support frame can pivot to minimize damage to the side mirror.

2. The apparatus of claim 1 wherein the wheel contact surface includes a portion that extends rearward beyond the support frame and beyond the side mirror.

3. The apparatus of claim 1 wherein the wheel is generally circular in shape and the wheel contact surface is disposed along the wheel circumference.

4. The apparatus of claim 1 wherein the wheel has a diameter that is greater than a width of the side mirror.

5. The apparatus of claim 1 wherein the wheel is mounted below the side mirror.

6. The apparatus of claim 1 wherein the vehicle comprises a fork lift.

7. An apparatus for protecting a side mirror of a vehicle, the apparatus comprising:
   a side mirror assembly pivotally mounted to and extending outwardly from a vehicle, wherein the side mirror assembly includes a side mirror and has an outer end; and
   a wheel rotatably mounted to the side mirror assembly so that the wheel can rotate in a generally horizontal plane, wherein the wheel is positioned and sized so that a wheel peripheral portion extends outward beyond the side mirror assembly outer end and extends forward beyond a forward side of the side mirror assembly;
   whereby when a surface of an obstacle contacts the wheel peripheral portion, the wheel can rotate and the side mirror assembly can pivot to minimize damage to the side mirror.

8. The apparatus of claim 7 wherein the wheel peripheral portion extends rearward beyond a rear side of the side mirror assembly.

9. The apparatus of claim 7 wherein the wheel is mounted below the side mirror.

10. The apparatus of claim 7 wherein the wheel has a diameter that is greater than a width of the side mirror.

11. The apparatus of claim 7 wherein the vehicle comprises a fork lift.

12. An apparatus for protecting a side mirror of a vehicle, the apparatus comprising:
   a side mirror assembly configured to be pivotally mounted to and to extend outwardly from a vehicle, wherein the side mirror assembly includes a side mirror, a support frame and an outer end having an outermost portion; and
   a generally circular wheel mounted to the side mirror assembly and configured so that, when the side mirror assembly is mounted to the vehicle, the wheel will rotate in a generally horizontal plane about a wheel axis disposed inside of a periphery of the wheel when the periphery of the wheel comes into contact with an obstacle;
   wherein the wheel periphery includes:
      a portion disposed outwardly beyond the outermost portion of the side mirror assembly; and
      a portion disposed forward of the side mirror assembly outer end.

13. The apparatus of claim 12 wherein the wheel has a diameter that is greater than a width of the side mirror.

14. The apparatus of claim 12 wherein the wheel is mounted below the side mirror.

15. The apparatus of claim 12 wherein the vehicle comprises a forklift.

16. The apparatus of claim 12 wherein the wheel periphery also includes a portion disposed rearward of the side mirror assembly outer end.

* * * * *